US007472405B2

(12) United States Patent
Pierce et al.

(10) Patent No.: US 7,472,405 B2
(45) Date of Patent: Dec. 30, 2008

(54) APPARATUS SYSTEM AND METHOD FOR USING MULTIPLE DETECTORS TO CONDUCT AN INVENTORY OF A DATA STORAGE LIBRARY

(75) Inventors: Steven Ned Pierce, Tucson, AZ (US); Jonathan Edward Bosley, Tucson, AZ (US); Brian Gerard Goodman, Tucson, AZ (US); Brian Dean Rasmussen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/202,825

(22) Filed: Aug. 12, 2005

(65) Prior Publication Data
US 2007/0039014 A1    Feb. 15, 2007

(51) Int. Cl.
*G11B 7/085* (2006.01)
*G11B 17/03* (2006.01)
(52) U.S. Cl. .................................... 720/630; 369/30.43
(58) Field of Classification Search ............... 720/630; 369/30.43
See application file for complete search history.

(56) References Cited

U.S. PATENT DOCUMENTS

2005/0268313 A1* 12/2005 Goodman et al. ............ 720/632
2006/0005209 A1*  1/2006 Chiang et al. ............... 720/600
2006/0090176 A1*  4/2006 Schmidtke et al. .......... 720/632

* cited by examiner

*Primary Examiner*—David D Davis
(74) *Attorney, Agent, or Firm*—Kunzler & McKenzie (57) ABSTRACT

A system, apparatus, and method are disclosed for conducting an inventory of a data storage library. The invention includes providing a plurality of data storage slots for storing data storage cartridges, providing an accessor having a plurality of detectors mounted thereon, and concurrently detecting cartridge information with the plurality of detectors for a corresponding plurality of data storage slots. The detectors may include any combination of detectors, including but not limited to, bar code scanners, radio frequency readers, cartridge presence sensors, or cameras. In certain embodiments, the invention also includes associating the cartridge information with the corresponding data storage slot and storing the information on a data bearing medium.

20 Claims, 9 Drawing Sheets

APPARATUS SYSTEM AND METHOD FOR USING MULTIPLE DETECTORS TO CONDUCT AN INVENTORY OF A DATA STORAGE LIBRARY

BACKGROUND OF THE INVENTION

1. Field of the Invention

This invention relates to conducting an inventory of a data storage library and more particularly relates to conducting an inventory of a data storage library with a plurality of cartridge information detectors.

2. Description of the Related Art

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media."

Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically include an accessor for transporting cartridges and conducting an inventory. The standard approach to conducting an inventory of a data storage library includes equipping the accessor with a cartridge detector and transporting the detector to read cartridge labels throughout the library. Though conducting an inventory by this means is effective to some extent, the current implementation includes a variety of short comings.

In an inventory system with only one detector, the detector may only read one type of information. For example, a bar code scanner can only obtain inventory information from cartridges with a bar code. Accordingly, the bar code scanner is unable to ascertain if a cartridge is present but has no bar code, if a cartridge is not present, or if a cartridge is present with an unreadable bar code. Additionally, having only one detector requires the accessor to conduct an inventory one storage slot at a time, thereby prolonging the time required to conduct the inventory. In other words, single-detector inventory systems are time-consuming and often unable to conduct a complete inventory.

Additionally, if the detector on the accessor breaks or otherwise ceases to function properly, the library has no backup means for conducting an inventory. Accordingly, an inventory cannot be taken until the library is shutdown and the detector is manually replaced. Thus, in addition to functioning slowly and collecting incomplete inventory data, single-detector systems often present formidable delays in the event of a detector malfunction.

From the foregoing discussion, it should be apparent that a need exists for a system, apparatus, and method that provide an expedited means for conducting a complete inventory. Beneficially, such a system, apparatus and method would decrease inventory time and increase the quality and completeness of the inventory data, in addition to providing a backup in the event of a detector malfunction.

SUMMARY OF THE INVENTION

The present invention has been developed in response to the present state of the art, and in particular, in response to the problems and needs in the art that have not yet been fully solved by currently available data storage library inventory systems. Accordingly, the present invention has been developed to provide an apparatus, system, and method for conducting an inventory of a data storage library that overcomes many or all of the above-discussed shortcomings in the art.

In one embodiment, the present invention provides a library controller for controlling the operation of the data storage library, a plurality of data storage slots for storing data storage cartridges, and an accessor having a plurality of detectors mounted thereon. The plurality of detectors concurrently detect cartridge information for a corresponding plurality of data storage slots. In certain embodiments, the library controller associates the cartridge information with the corresponding data storage slot, stores the cartridge information or provides the information to a host computer.

In certain embodiments, the detectors include any assortment of detector types including, but not limited to, bar code scanners, radio frequency (RF) readers, cartridge presence sensors, or cameras. The cartridge information detected by the detectors may include bar code information, cartridge label information, cartridge identification information, information emitted by the cartridge via radio waves, and cartridge presence information. The invention expedites conducting an efficient inventory of a data storage library by providing a plurality of detectors and concurrently using the detectors to collect cartridge information.

An apparatus of the present invention is also presented for conducting an inventory of a data storage library. In one embodiment, the apparatus includes an accessor configured to access a plurality of data storage slots, and a plurality of detectors mounted on the accessor and configured to concurrently detect cartridge information for a corresponding plurality of data storage slots. In certain embodiments, a library controller associates the cartridge information with the corresponding data storage slot and stores the information on a data bearing medium.

A method of the present invention is also presented for conducting an inventory of a data storage library. The method in the disclosed embodiments substantially includes the steps necessary to carry out the functions presented above with respect to the operation of the described system and apparatus. In one embodiment, the method includes providing a library controller for controlling the operation of the data storage library, providing a plurality of data storage slots for storing data storage cartridges, providing an accessor having a plurality of detectors mounted thereon, and concurrently detecting cartridge information with the plurality of detectors for a corresponding plurality of data storage slots. The method may also include associating cartridge information with the corresponding data storage slot and storing the cartridge information on a data bearing medium.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, across several memory devices, and executed by several processors. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
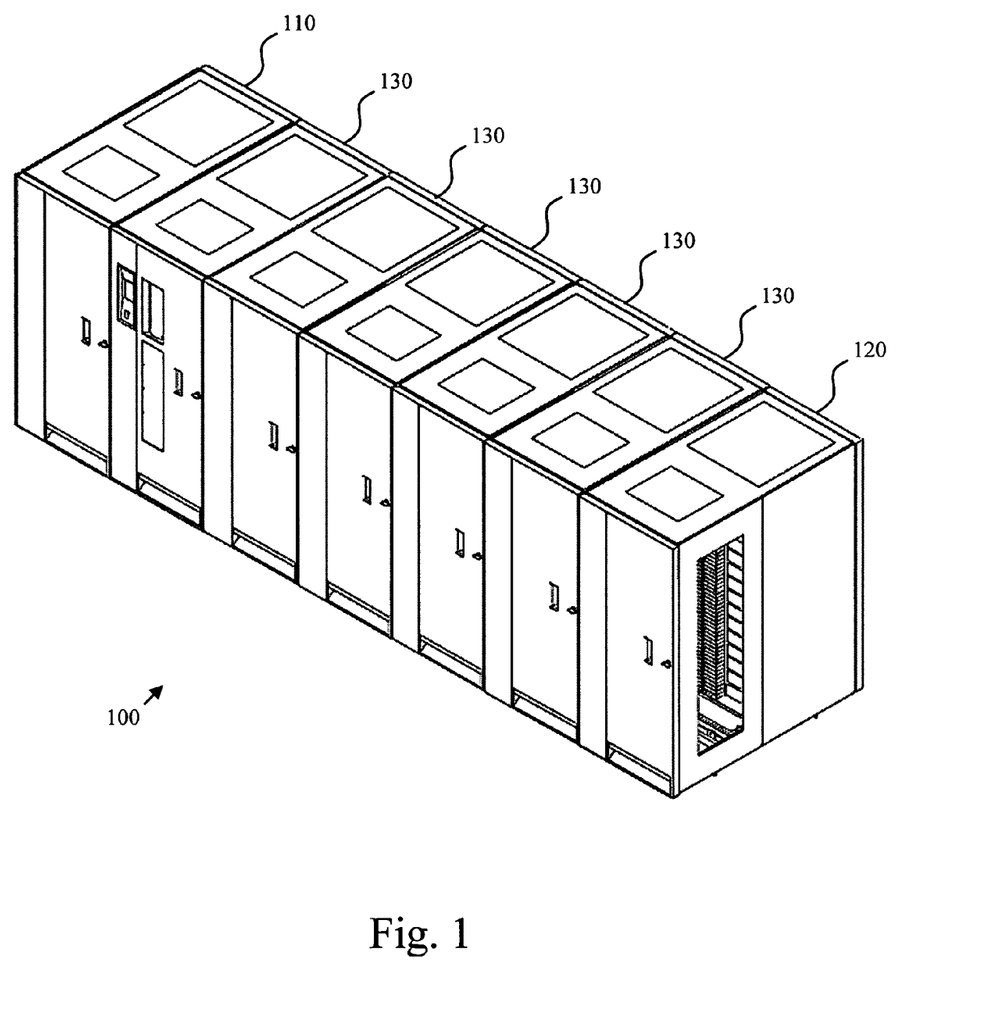
FIG. 1 is a perspective view of one embodiment of an automated data storage library in accordance with the present invention.
Figure 2:
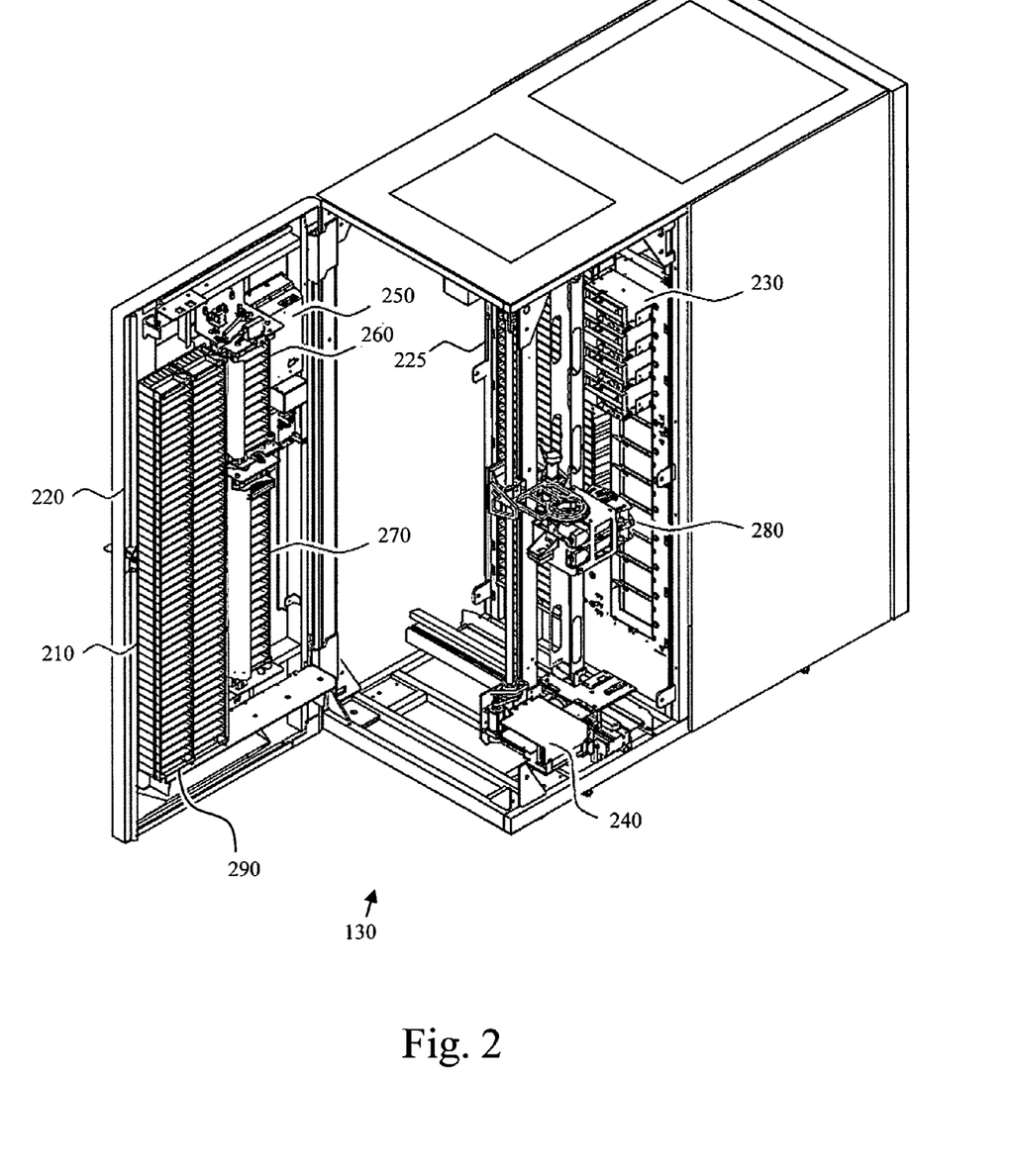
FIG. 2 is a perspective view of one embodiment of a single frame of an automated data storage library in accordance with the present invention.

FIGS. 1 and 2 illustrate an automated data storage library 100 which stores and retrieves data storage cartridges containing data storage media (not shown). It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library.

The library of FIG. 1 comprises a left hand service bay 110, one or more storage frames 130, and a right hand service bay 120. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 130, which is the base frame of the library 100 and is contemplated to be the minimum configuration of the library. In this minimum configuration, there is only a single accessor (i.e., there are no redundant accessors) and there is no service bay. The library 100 is arranged for accessing data storage media in response to commands from at least one external host system (not shown), and comprises a plurality of storage shelves 210, on front wall 220 and rear wall 225 for storing data storage cartridges that contain data storage media; at least one data storage drive 230 for reading and/or writing data with respect to the data storage media; and an accessor 240 for transporting the data storage media between the plurality of storage shelves 210 and the data storage drive(s) 230.

The data storage drives 230 may be optical disk drives or magnetic tape drives, or other types of data storage drives as are used to read and/or write data with respect to the data storage media. The storage frame 130 may optionally comprise an operator panel 250 or other user interface, such as a web-based interface, which allows a user to interact with the library. The storage frame 130 may optionally comprise an upper I/O station 260 and/or a lower I/O station 270, which allows data storage media to be inserted into the library and/or removed from the library without disrupting library operation. The library 100 may comprise one or more storage frames 130, each having storage shelves 210 accessible by an accessor 240.

As described above, the storage frames 130 may be configured with different components depending upon the intended function. One configuration of storage frame 130 may comprise storage shelves 210, data storage drive(s) 230, and other optional components to store and retrieve data from the data storage cartridges. The accessor 240 comprises a gripper assembly 280 for gripping one or more data storage media and may include a plurality of detectors mounted on the gripper assembly 280 to detect cartridge information.

Figure 3:
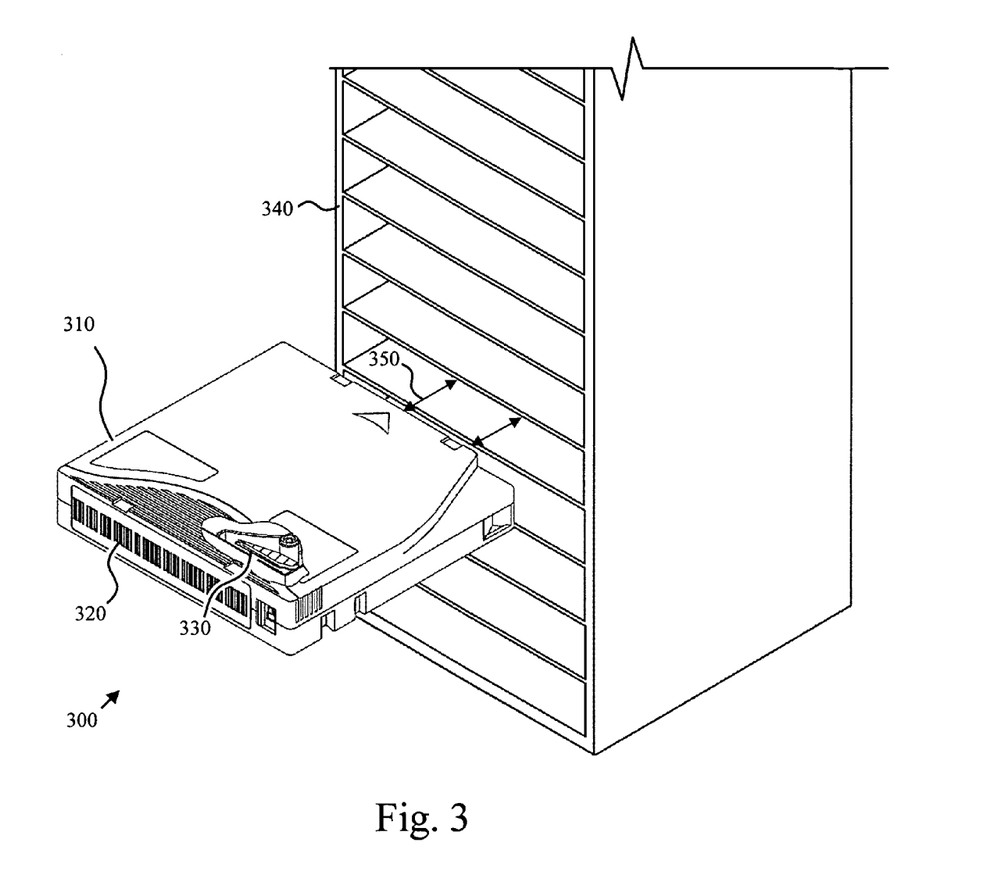
FIG. 3 is a perspective view of one embodiment of a data storage cartridge and plurality of data storage slots in accordance with the present invention.

FIG. 3 illustrates a data storage cartridge and associated data storage slots 300. While FIG. 3 shows one type of data storage slot 340, there may be other types of data storage slots in the library. For example, there may be drive slots associated with drive 230, import/export slots associated with I/O station 260 and 270, gripper slots associated with gripper assembly 280, etc. Herein, data storage slot may refer to any slot capable of holding a data storage cartridge. The depicted illustration includes a cartridge 310, a cartridge information member 320, a plurality of data storage slots 340, and a cartridge memory 330 shown in a cutaway portion of the Figure. The information member 320 may include any data bearing medium including a bar code, OCR (Optical Character Recognition) identifier, reflector, label, surface or feature of cartridge 310, or RFID tag (radio transmitter).

The cartridge 310 may be stored or removed from any of the plurality of data storage slots 340 via the motion 350. This is only one example of many possible cartridges and storage slot arrangements, and is not meant to limit the invention in any way. In fact, a variety of data storage cartridge configurations and associated storage slot arrangements may be implemented in accordance with the present invention.

Figure 4:
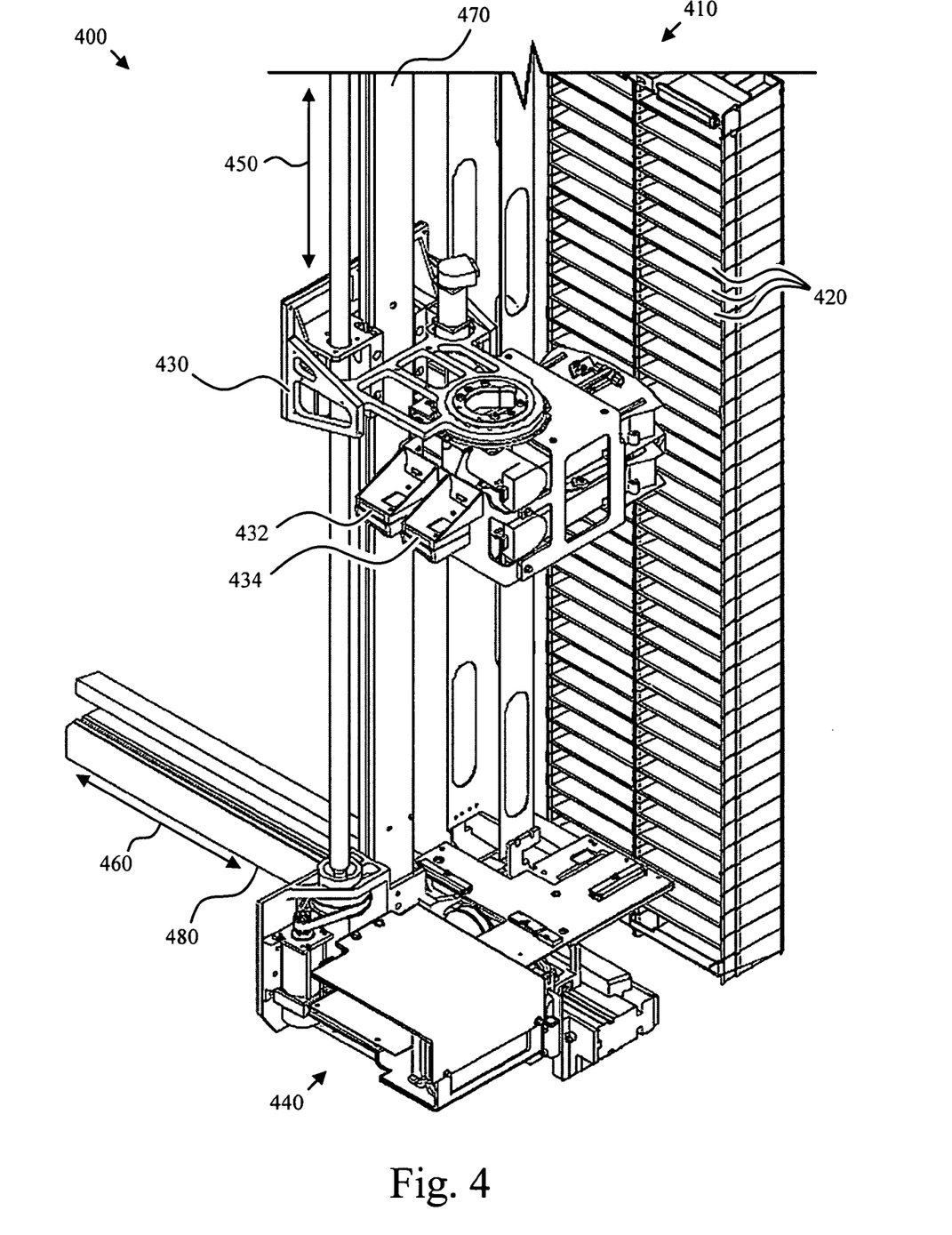
FIG. 4 is a perspective view of one embodiment of a data storage inventory system in accordance with the present invention.

FIG. 4 is a perspective view of a data storage inventory system 400 which comprises certain elements of library system 100. The depicted system 400 includes a plurality of storage columns 410, a plurality of storage slots 420, a mobile accessor member 430, a first detector 432, a second detector 434, an accessor 440, an x-rail 480, and a y-rail 470. In certain embodiments, the system 400 may further include a data bearing medium for storing inventory information detected by the detectors 432, 434. The system 400 may also include a host computer coupled to the data storage library for receiving detected cartridge information via the library controller (not shown). The various components of the system 400 function cooperatively to expeditiously conduct a complete inventory of the storage slots 420.

The depicted storage slots 420 are configured to store data storage cartridges 310. The plurality of storage slots 420 may be embodied as any shape, size, material, or formation congenial to storing data storage cartridges 310. For example, the storage slots 420 may be substantially circular, octagonal, or rectangular (as seen in FIGS. 2, 3, and 4). Similarly, the storage slots 420 may be arranged in any fashion such as directly opposing one another or angled with respect to one another. By way of example only, in FIG. 4 the storage slots 420 are arranged in adjacent columns 410.

The accessor 440 includes a plurality of detectors 432, 434. The accessor 440 may also include the x-rail 480, y-rail 470, and mobile accessor member 430 such as a gripper assembly. In the depicted embodiment, the mobile accessor member 430 includes a first detector 432 and a second detector 434. One function of the accessor 440 is to transport the detectors 432, 434 during the inventory process. In the depicted embodiment, the accessor 440 is configured to transport the detectors 432, 434 in the direction 460 via the x-rail 480 and in the direction 450 via the y-rail 470, thereby enabling the detectors 432, 434 to detect cartridge information from all of the storage slots 420. Other embodiments include alternative transport means depending upon the overall system design.

The plurality of detectors 432, 434 concurrently detect cartridge information for a corresponding plurality of storage slots 420. In certain embodiments, a library controller (see FIG. 5) is configured to associate the cartridge information with the corresponding data storage slot 420 and store the data on a data bearing medium. Though the depicted system 400 includes only two detectors 432, 434, the present invention enables the use of more than two detectors.

A detector may be any device fit to detect cartridge information including, but not limited to, a bar code scanner, an RF reader, a cartridge presence sensor, a camera, or the like. The bar code scanner may comprise a laser scanner, holographic scanner, line camera, CCD (Charge Coupled Device), LED (Light Emitting Diode) emitter/detector, etc. The RF reader may comprise an RFID tag, etc. For example, the LTO (Linear Tape Open) cartridge contains a cartridge memory which comprises an RFID tag.

An RFID reader/writer may be located in the drive and/or on the library accessor to read information from, or to write information to, the cartridge memory. The cartridge presence sensor may comprise a light source and detector, Hall Effect sensor, reed sensor, proximity sensor, touch sensor, etc. In addition, the cartridge presence sensor may comprise an emitter at the back of the storage cell and a detector on the library accessor. A cartridge in the storage cell would block the energy of the emitter. The energy may comprise air flow, light, RF energy, etc.

The camera may comprise a CMOS camera, CCD camera, or other suitable imaging device. The library controller may analyze the camera image to decode or obtain cartridge information such as the value of a label or the presence of a cartridge. Alternatively, the camera image may comprise the cartridge information.

In certain embodiments, the detectors 432, 434 are of the same type. For example, the detectors 432, 434 may both be bar code scanners. In certain embodiments, the two detectors 432, 434 simultaneously detect cartridge information from different storage slots 420, thereby expediting the inventory process. In other embodiments, the detectors 432, 434 provide a backup for one another if one should cease to function properly.

Additionally, the detectors may be of the same type but positioned differently. For example, certain bar codes may be more susceptible to reflection than others, resulting in reading difficulties for bar code scanners positioned at a particular angle. Providing detectors at different angles overcomes this difficulty by providing means for reading both reflective and non-reflective bar codes. In certain embodiments, the detectors may also be angled to read adjacent slots from a single position on the accessor.

Additionally, the detectors 432, 434 may be of the same type, but have different qualities. For example, one bar code scanner may have a greater capacity to read faded bar codes, but may function at a lower overall rate. The other bar code scanner may not read faded bar codes as effectively, but may function at a higher overall rate. In such an embodiment, the slower, more thorough scanner may be used to only read what the faster, less thorough bar code scanner cannot. In such an embodiment, the plurality of detectors 432, 434 function cooperatively to provide a more effective and efficient means for conducting a complete inventory.

In other embodiments, the detectors 432, 434 are of different types. For example, the first detector 432 may be a bar code scanner and the second detector 434 may be a presence sensor. In such an embodiment, the presence sensor detects whether a data storage cartridge currently resides in a particular slot 420. If no data storage cartridge is detected, then the bar code scanner need not attempt to read a bar code, thereby decreasing the overall inventory time.

Providing different detectors 432 and 434 such as a bar code scanner and presence sensor, may be particularly useful to determine if a cartridge lacks an information member 320. In such a scenario, the presence sensor would detect a cartridge but the bar code scanner would detect no bar code. Accordingly, the system 100 could infer that the cartridge either has no bar code or has an unreadable bar code. Providing different detectors 432, 434 therefore, enables the system 100 to obtain a more accurate inventory of the library.

Another example of having two different detectors 432, 434 is having a bar code scanner and a camera. If the bar code scanner is unable to obtain any information from the cartridge, the camera may then take a picture of the data storage slot 420. By doing so, the system 100 may determine why the bar code scanner is unable to obtain any information, such as an existent but unreadable bar code or a non-existent bar code. Additionally, in embodiments wherein the cartridge information member 320 includes a label, the camera may take a picture of the label for analysis or other inventory purposes. For example, the camera image may be decoded or interpreted in such a way that the contents or value of the label is rendered in a digital or ASCII form. The label value being decoded may comprise bar codes, brail or other symbols, text characters, etc.

Depending upon the storage slot 420 configuration, the detectors 432, 434 may be positioned in any arrangement to facilitate conducting an inventory. For example, if two data storage columns 410 are adjacent one another (as in FIG. 4), the detectors 432, 434 may be configure accordingly to simultaneously obtain information from adjacent columns 410. In a similar manner, the detectors 432, 434 may be configured accordingly to simultaneously obtain information from adjacent rows of cartridges. Herein, columns may refer to columns or rows.

Additionally, the detectors 432, 434 may be positioned to simultaneously obtain cartridge information from sequential or non sequential cartridges within the same column or row. The concept of positioning the detectors 432, 434 according to storage slot organization is replicable with any storage slot arrangement. Accordingly, the system 400 provides an efficient means of conducting a thorough inventory by using a variety of cartridge detection means and arrangements.

Figure 5:
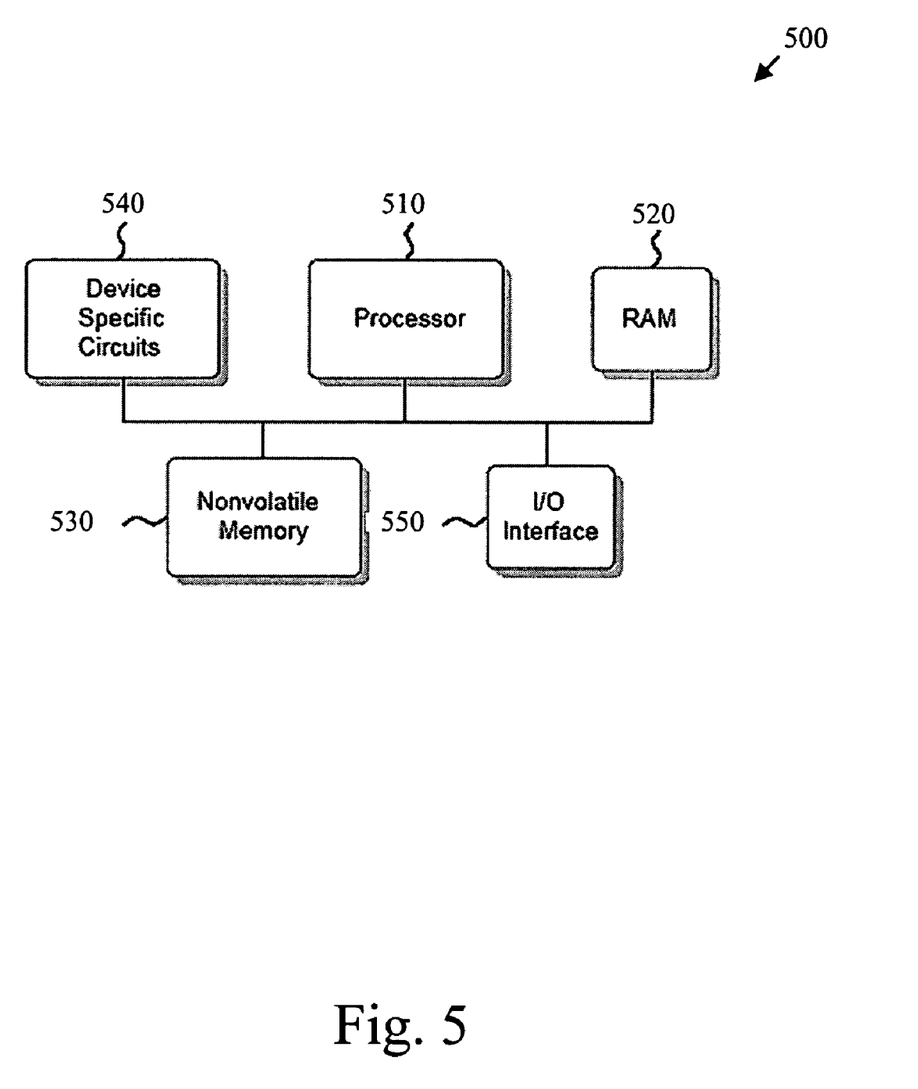
FIG. 5 is a block diagram of one embodiment of a library controller.

The data storage inventory system 100 also includes a library controller for controlling the operation of the data storage library (see FIG. 5). The library controller may be one or more controllers configured to direct the operation of the automated data storage library. In certain embodiments, the controller is configured to store detected information and provide the information to a host computer. A controller may take many different forms and may comprise, for example but not limited to, an embedded system, a distributed control system, a personal computer, or a workstation, etc. Essentially, the term "controller" as used herein is intended in its broadest sense as a device or system that contains at least one processor.

FIG. 5 is one example of a library controller. The depicted controller 500 includes a processor 510, RAM (Random Access Memory) 520, nonvolatile memory 530, device specific circuits 540, and I/O interface 550. The processor 510 may comprise, for example, an off-the-shelf microprocessor, custom processor, FPGA (Field Programmable Gate Array), ASIC (Application Specific Integrated Circuit), discrete logic, or the like. The RAM (Random Access Memory) 520 is typically used to hold variable data, stack data, executable instructions, and the like.

The nonvolatile memory 530 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), MRAM (Magnetoresistive Random Access Memory), battery backup RAM, hard disk drives, etc. The nonvolatile memory 530 is typically used to hold the executable firmware and any nonvolatile data. The I/O interface 550 comprises a communication interface that allows the processor 510 to communicate with devices external to the controller 500. Examples may comprise, but are not limited to, serial interfaces such as RS-232, USB (Universal Serial Bus), Fibre Channel, SCSI (Small Computer Systems Interface), etc.

The device specific circuits 540 provide additional hardware to enable the controller 500 to perform unique functions such as, but not limited to, motor control of a cartridge gripper. The device specific circuits 540 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 540 may reside outside the controller 500.

Figure 6:
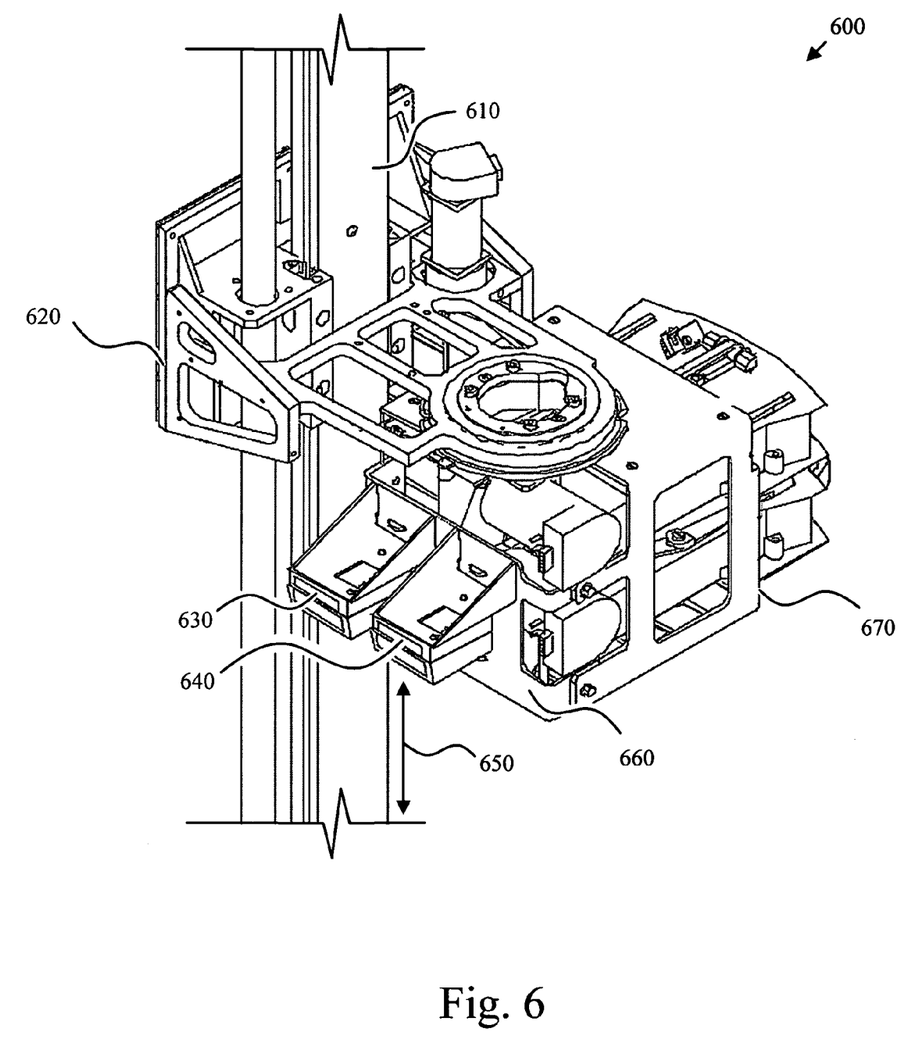
FIG. 6 is a perspective view of a data storage inventory apparatus in accordance with the present invention.

FIG. 6 is a perspective view of a data storage inventory apparatus 600 which comprises certain elements of library system 100. The depicted apparatus 600 shows a portion of an accessor, such as accessor 240 in FIG. 2. Apparatus 600 includes a y-rail 610, mobile accessor member 620, a first detector 630, a second detector 640, a front side 660, and a back side 670. In certain embodiments, the apparatus 600 (or other elements of library 100) stores detected cartridge information on a data bearing medium.

The data bearing medium may comprise RAM (Random Access Memory) such as SRAM (Static Random Access Memory), DRAM (Dynamic Random Access Memory), SDRAM (Synchronous Dynamic Random Access Memory), DDR DRAM (Double Data Rate DRAM), MRAM (Magnetoresistive Random Access Memory), or any other random access memory as is known to those of skill in the art. Alternatively, the data bearing medium may comprise other electronic memories such as EEPROM, flash PROM, MEMS (Micro-Electro Mechanical Systems) based storage, CompactFlash™, SD (Secure Digital) media™, Memory Stick™, or any other electronic memory as is known to those of skill in the art.

In addition, the data bearing medium may comprise electronic circuits such as discrete logic, registers or flip-flops, FPGA (Field Programmable Gate Array), ASIC (Application Specific Integrated Circuit). Still further, the data bearing medium may comprise the storage medium of storage devices such as hard disk drives, floppy drives, optical drives, micro drives, tape drives, or any other storage device as is known to those of skill in the art. The apparatus 600 (or other elements of library 100) may also include a library controller (not shown, see FIG. 5) for controlling the operation of the data storage library, associating the cartridge information with a corresponding data storage slot, storing cartridge information, and providing cartridge information to a host computer. The apparatus 600 enables a more effective and efficient manner of conducting an inventory of a data storage library 100 by providing a plurality of detectors 630, 640 that concurrently detect cartridge information.

The depicted apparatus 600 accesses a plurality of data storage slots and has a plurality of detectors 630, 640 mounted thereon. In the depicted embodiment, the mobile accessor member 620 moves vertically via a y-rail 610 and horizontally by an x-rail 480 (See FIG. 4). In the depicted embodiment, the detectors 630, 640 are mounted upon mobile accessor member 620 along with a gripper assembly, such that the detectors 630, 640 and cartridge grippers are mounted upon the same device. Using the same mobile device for gripping cartridges and conducting an inventory provides for a less cluttered data storage library 100.

The detectors 630, 640 concurrently detect cartridge information for a corresponding plurality of data storage slots 420 (see FIG. 4). In certain embodiments, the library controller associates the cartridge information with the corresponding data storage slot. The plurality of detectors taught by the present invention may include, but are not limited to, bar code scanners, RF readers, cartridge presence sensors, cameras, and the like. The cartridge information detected thereby may include bar code information, cartridge label information, cartridge identification information, information emitted by the cartridge via radio waves, and cartridge presence information.

In the depicted embodiment, the detectors 630, 640 are mounted on the front side 660 of the accessor 600. However, the detectors 630, 640 may be mounted in any fashion to facilitate conducting an inventory of a particular library. For example, in a library with storage slots arranged in opposing rows, the accessor 600 may include one detector on the front side 660 and another detector on the back side 670, such that the accessor 600 may pass between the opposing rows and simultaneously detect cartridge information from each row. Accordingly, the apparatus 600 provides expedited means for conducting a complete inventory by providing a plurality of detectors positioned congenial to a data storage slot 420 arrangement.

Figure 7A:
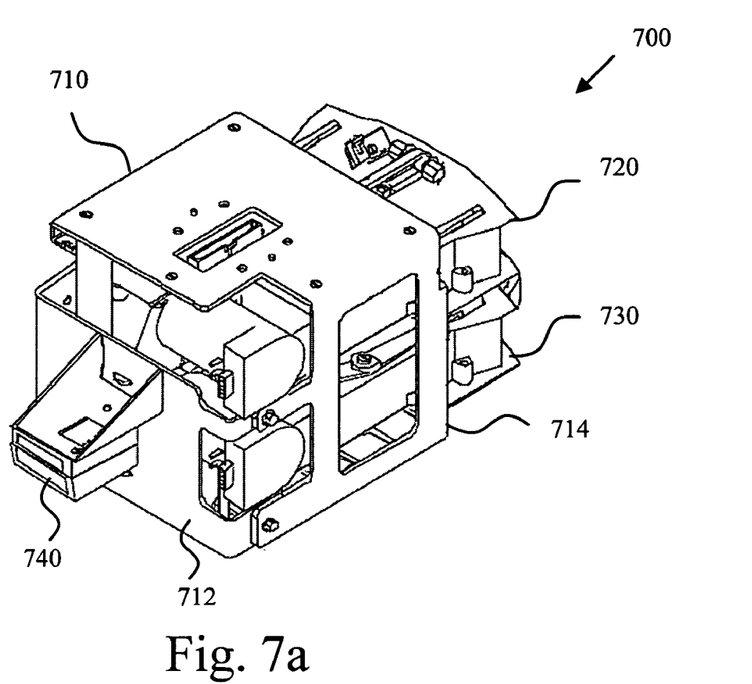
FIG. 7a is a front side perspective view of a data storage inventory apparatus in accordance with the present invention.
Figure 7B:
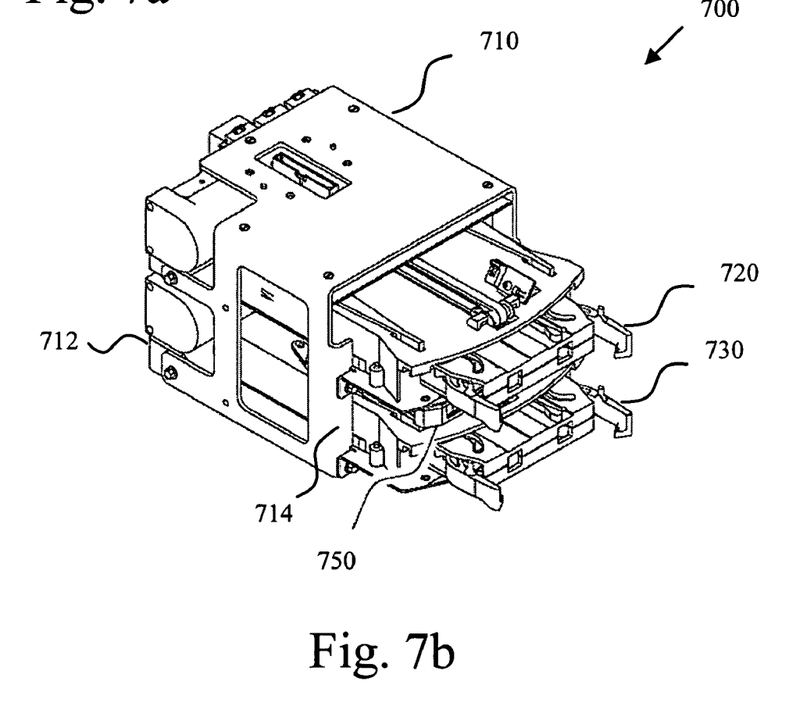
FIG. 7b is a back side perspective view of a data storage inventory apparatus in accordance with the present invention.

FIGS. 7a and 7b are front side and back side views of a data storage inventory apparatus 700 which comprises certain elements of an accessor. The depicted apparatus 700 will be referred to as accessor 710 and it should be noted that there may be additional elements associated with accessor 710 that are not shown. The depicted apparatus 700 includes a first gripper 720, a second gripper 730, a bar code scanner 740, and a presence sensor 750. The depicted apparatus 700 provides a means for conducting an inventory in accordance with the present invention.

The accessor 710 includes a first and second gripper 720, 730 mounted on the accessor back side 714. The accessor 710 also includes a bar code scanner 740 positioned on the accessor front side 712. The accessor 710 also includes a presence sensor 750 positioned on the accessor back side 714, between the first and second grippers 720, 730. As the barcode scanner 740 and presence sensor 750 are positioned at the accessor front side 712 and accessor back side 714 respectively, the accessor may simultaneously obtain data storage cartridge information from data storage slots on either side of the accessor.

In certain embodiments, the presence sensor is also a calibration sensor. The calibration sensor may be configured detect a calibration target such as a hole or reflective surface near one or more data storage slots. In certain embodiments, the precise location of the data storage slots may be different from a manufacturer's estimations or specifications. Providing a calibration sensor enables the accessor to determine precise location of each data storage slot, despite manufacturing errors.

Figure 8:
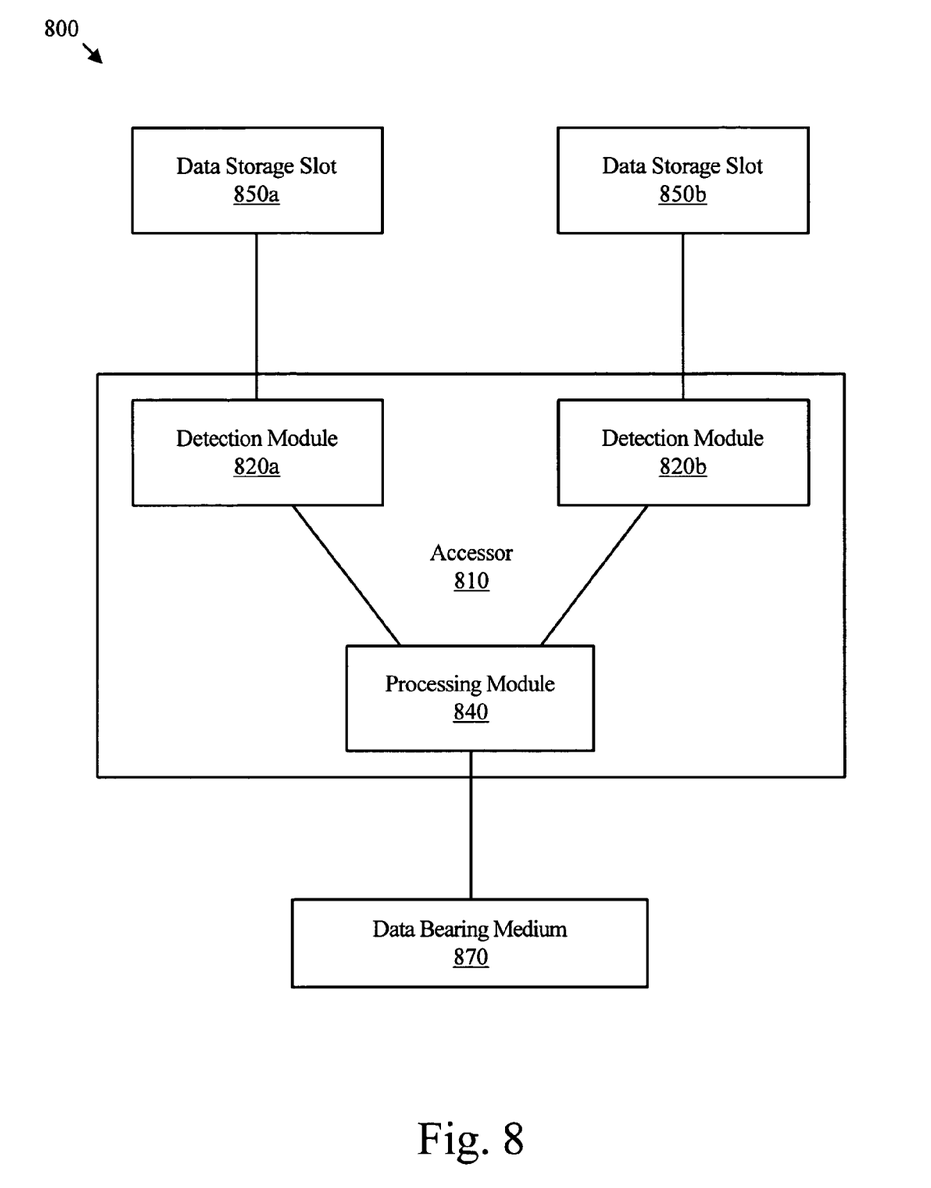
FIG. 8 is a block diagram of a data storage inventory apparatus of one embodiment of a method for conducting an inventory of a data storage library.

FIG. 8 is a block diagram of a data storage inventory apparatus 800. The depicted apparatus 800 includes an accessor 810, a detection module 820a, a detection module 820b, and a processing module 840. The depicted apparatus 800 provides one of many possible module configurations of the present invention. While FIG. 8 shows the detection module 820a, detection module 820b, and processing module 840 as being associated with the accessor, this is for illustrative purposes only and is not meant to limit the invention to any physical or logical association. For example, any of these elements may be located on, or associated with, another component of the library 100.

The detection modules 820a, 820b simultaneously detect cartridge information from a corresponding number of data storage slots 850a, 850b. The data collected therefrom may be transferred to a processing module 840 for processing the information which may include associating the cartridge information with the corresponding data storage slot. The raw data or processed data extracted therefrom may be sent to a data bearing medium 870 for storage, where the information may later be accessed by other devices, such as a data storage library controller, operator panel, or host computer.

After detecting cartridge information for the data storage slots 850a, 850b, the apparatus 800 may then move on to an additional set of data storage slots to collect additional cartridge information therefrom. Simultaneously or concurrently detecting cartridge information refers to detection at substantially the same time as it relates to the library inventory operation. For example, detector 630 (FIG. 6) may read a cartridge label from one cartridge while detector 640 is reading a cartridge label from another cartridge. In addition, one of the two detectors may start reading a cartridge label before the other detector begins reading a cartridge label.

As described above, data storage slots may comprise any slot or location that a cartridge may reside. This invention is not limited to any particular type of data storage slot. For example, the library controller may direct detection module 820a to inventory data storage slots 850a while detection module 820b inventories drive slots (not shown in FIG. 8).

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method.

In certain embodiments, processing of the cartridge information may be distributed amongst any number of modules in the present invention. For example, other modules such as the detection modules 820a, 820b may process all or a substantial portion of the information instead of the processing module. Additionally, the extent and nature of the processing that occurs within the apparatus 800 may depend upon the configuration and capacities of the associated data storage library 100 (see FIG. 1).

Figure 9:
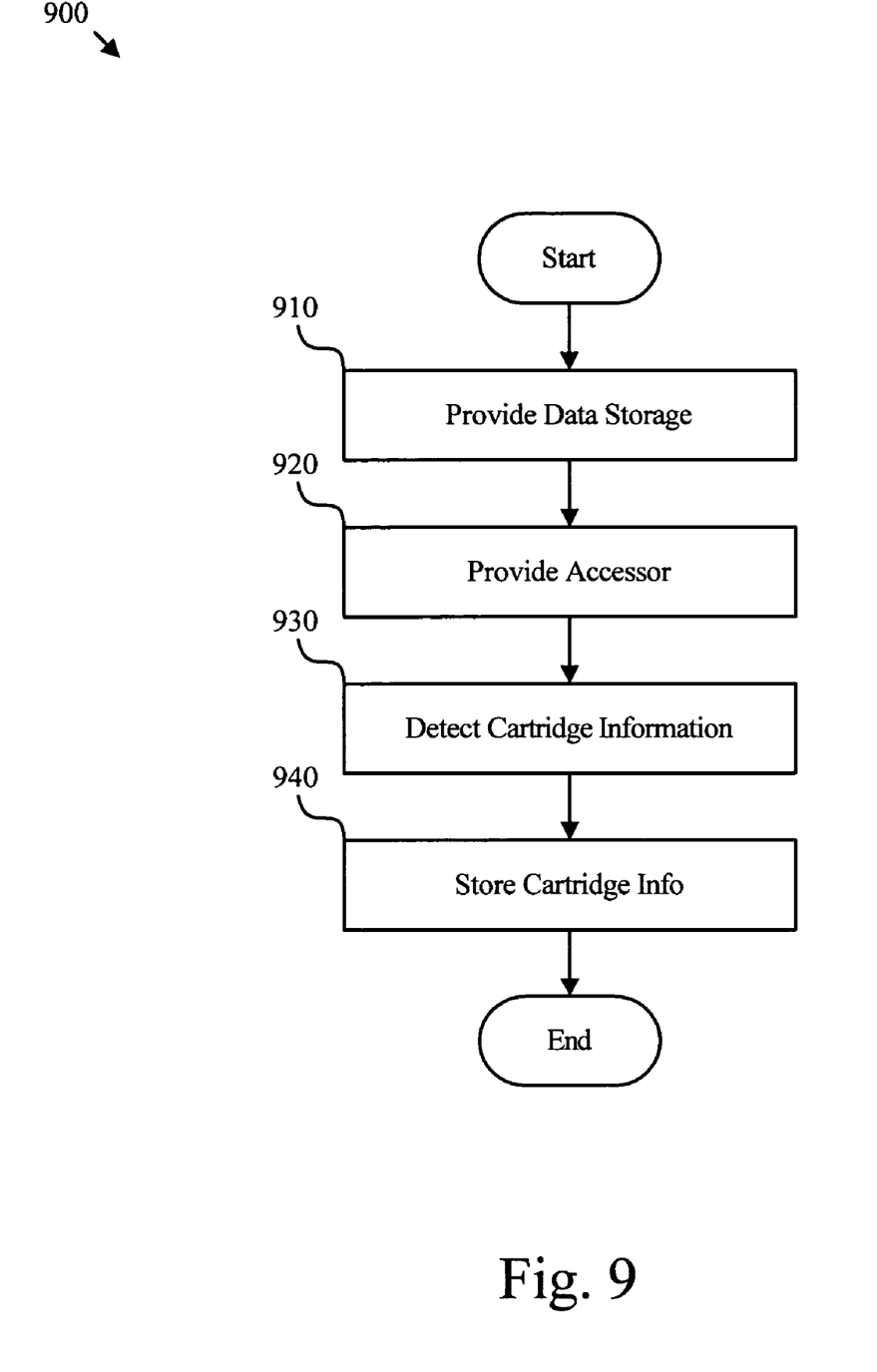
FIG. 9 is a flow chart diagram of one embodiment of a method for conducting an inventory of a data storage library.

FIG. 9 is a flow chart diagram of a method 900 for conducting an inventory of a data storage library 100 (see FIG. 1). The depicted method 900 includes providing 910 a plurality of data storage slots for storing data storage cartridges, providing 920 an accessor having a plurality of detectors mounted thereon, concurrently detecting 930 cartridge information with the plurality of detectors for a corresponding plurality of data storage slots, and storing 940 the cartridge information in a data bearing medium. In certain embodiments, the method 900 also includes associating the cartridge information with the corresponding data storage slot. The method may also include providing a host computer for receiving and storing detected cartridge information via a library controller (see FIG. 5).

Providing 910 a plurality of data storage slots for data storage cartridges 310 may include providing data storage slots 420 of any shape, design, material, or configuration. In many embodiments, the characteristics of the data storage slots 420 will substantially depend upon the characteristics of the data storage cartridges 310. For example, in an embodiment wherein the data storage cartridges are substantially rectangular, the data storage slots may likewise be rectangular (see FIG. 3).

Additionally, providing 910 data storage slots 420 may also include arranging the slots 420 in any fashion suitable for access. In certain embodiments, the arrangement of the storage slots 420 depends upon the shape of the individual storage slots 420 as well as the overall shape and configuration of the data storage library 100. For example, in FIG. 2 rectangular storage slots 210 form rectangular storage slot columns 290 on a substantially rectangular front wall 220.

The data storage slots may comprise drive slots where the slots are associated with data storage drives. In addition, the data storage slots may comprise storage slots for holding or storing the data storage media until it is needed by a data storage drive or until it is needed by an operator. Still further, the data storage slots may comprise import/export slots where the slots are associated with an I/O station to allow an operator to remove media from the library, or place media into the library.

Providing 920 an accessor 440 having a plurality of detectors 432, 434 mounted thereon may include providing and mounting the detectors 432, 434 on the gripper assembly of the mobile accessor member 430. In such an embodiment, the accessor 440 provides the dual function of transporting cartridges 310 and collecting inventory information, providing a simplified and efficient data storage library 100. Providing 920 an accessor 440 having a plurality of detectors 432, 434 may also include providing detectors of various types. Accordingly, the plurality of detectors 432, 434 may include, but are not limited to, any combination of bar code scanners, RF readers, cartridge presence sensors, or cameras.

Also, the detectors 432, 434 may be arranged in any suitable manner, provided the arrangement enables the detectors 432, 434 to concurrently detect cartridge information from a corresponding plurality of data storage slots 420. In many embodiments, the arrangement of the detectors 432, 434 will substantially depend upon the arrangement of the storage slots 420. For example, if a library 100 contains storage slots arranged in adjacent, vertical columns on a common wall, the detectors 432, 434 may be accordingly adjacently positioned and angled to concurrently detect cartridge information from both columns.

Concurrently detecting 930 cartridge information with the plurality of detectors 432, 434 for a corresponding plurality of data storage 420 slots may include detecting information in accordance with the functionality of the detectors 432, 434. Accordingly, the cartridge information may include cartridge bar code information, cartridge label information, cartridge identification information, information emitted by the cartridge via radio waves, and cartridge presence information.

Storing cartridge information 940 may include processing the information obtained by the detectors 432, 434 and storing the information on a data bearing medium. In certain embodiments, the stored data is later accessed by a data library operator panel 250 or host computer system. Accordingly, the method 900 provides a means of concurrently conducting an inventory via a plurality of detectors 432, 434 and storing the inventory data on a data bearing medium for later use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for conducting an inventory of a data storage library, the system comprising:
    a library controller for controlling the operation of the data storage library;
    a plurality of data storage slots configured to store data storage cartridges;
    an accessor having a plurality of detectors mounted thereon;
    the plurality of detectors configured to concurrently detect cartridge information for a corresponding plurality of data storage slots; and
    the plurality of detectors comprising a presence detector configured to detect a presence of a first cartridge within a first data storage slot and a bar code reader configured to read bar code information for a second cartridge within a second data storage slot concurrent with the presence detector detecting the presence of the first cartridge within the first data storage slot.

2. The system of claim 1, further comprising a data bearing medium for storing the cartridge information detected by the plurality of detectors.

3. The system of claim 1, wherein the library controller is configured to associate the cartridge information with the corresponding data storage slot.

4. The system of claim 1, wherein cartridge information is selected from the group consisting of bar code information, label information, cartridge identification information, information emitted by the cartridge via radio waves, and cartridge presence information.

5. The system of claim 1, further comprising a host computer coupled to the data storage library, wherein the library controller stores the detected cartridge information and provides the cartridge information to the host computer.

6. The system of claim 1, wherein the arrangement of the detectors corresponds to the arrangement of the data storage slots.

7. The system of claim 1, wherein one or more of the plurality of detectors is selected from the group consisting of a bar code reader, camera, cartridge presence sensor, and radio frequency reader.

8. A machine readable medium comprising operations for conducting an inventory of a data storage library, the operations comprising:
concurrently detecting cartridge information with a plurality of detectors for a corresponding plurality of data storage slots by detecting a presence of a first cartridge within a first data storage slot with a presence detector concurrently with reading bar code information for a second cartridge within a second data storage with a bar code reader; and
storing the cartridge information on a data bearing medium.

9. The system of claim 1, wherein the plurality of data storage slots comprises a first column of storage slots and a second column of storage slots, and where the plurality of detectors comprises a first detector and a second detector, and wherein the first detector is arranged to correspond to the first column of storage slots and the second detector is arranged to correspond to the second column of storage slots, wherein the first detector detects cartridge information from the first column and the second detector detects cartridge information from the second column.

10. An apparatus for conducting an inventory of a data storage library, the apparatus comprising:
an accessor configured to access a plurality of data storage slots;
a plurality of detectors mounted on the accessor and configured to concurrently detect cartridge information for a corresponding plurality of data storage slots; and
the plurality of detectors comprising a presence detector configured to detect a presence of a first cartridge within a first data storage slot and a bar code reader configured to read bar code information for a second cartridge within a second data storage slot concurrent with the presence detector detecting the presence of the first cartridge within the first data storage slot.

11. The apparatus of claim 10, further comprising a data bearing medium configured to store the detected cartridge information detected by the plurality of detectors.

12. The apparatus of claim 10, further comprising a library controller for controlling the operation of the data storage library and associate the cartridge information with a corresponding data storage slot.

13. The apparatus of claim 12, wherein the library controller is further configured to store detected cartridge information and provide the cartridge information to a host computer.

14. The apparatus of claim 10, wherein cartridge information is selected from the group consisting of bar code information, label information, cartridge identification information, information emitted by the cartridge via radio waves, and cartridge presence information.

15. The apparatus of claim 10, wherein the arrangement of the detectors corresponds to the arrangement of the data storage slots.

16. The apparatus of claim 10, wherein one or more of the plurality of detectors is selected from the group consisting of a bar code reader, camera, cartridge presence sensor, and radio frequency reader.

17. The apparatus of claim 10, wherein the plurality of data storage slots comprises a first column of storage slots and a second column of storage slots, and where the plurality of detectors comprises a first detector and a second detector, and wherein the first detector is arranged to correspond to the first column of storage slots and the second detector is arranged to correspond to the second column of storage slots, wherein the first detector detects cartridge information from the first column and the second detector detects cartridge information from the second column.

18. The machine readable medium of claim 8, wherein cartridge information is selected from the group consisting of bar code information, label information, cartridge identification information, information emitted by the cartridge via radio waves, and cartridge presence information.

19. The machine readable medium of claim 8, further comprising storing the cartridge information on a data bearing medium detected by the plurality of detectors.

20. The machine readable medium of claim 8, further comprising associating the cartridge information with the corresponding data storage slot.

* * * * *